G. SHIELDS.
BARREL.
APPLICATION FILED AUG. 26, 1909.
961,737.
Patented June 14, 1910.
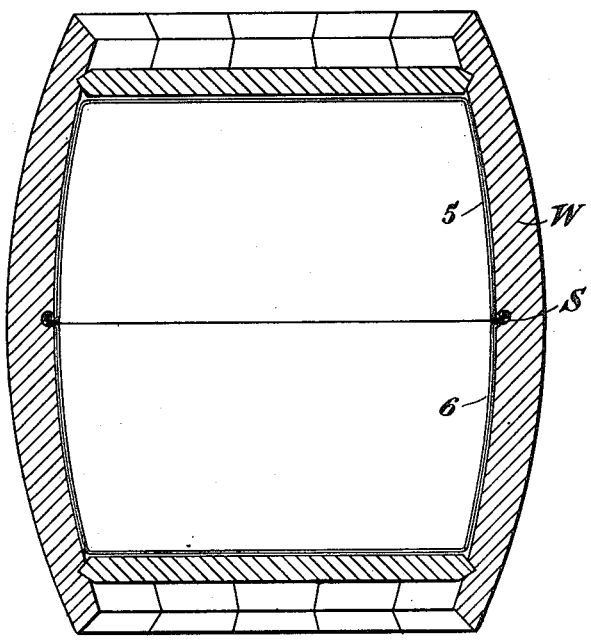
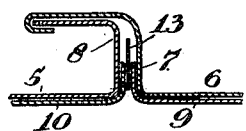
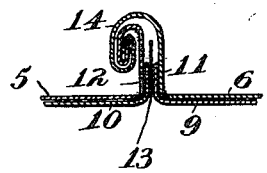
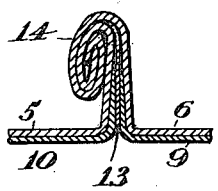
Witnesses:
L. C. Badeau.
H. D. Penney
Inventor:
George Shields,
By his Attorney, F. H. Richards.

UNITED STATES PATENT OFFICE.

GEORGE SHIELDS, OF BROOKLYN, NEW YORK, ASSIGNOR, BY MESNE ASSIGNMENTS, TO THE GLASS ENAMELED PACKAGE CO., OF WESTCHESTER COUNTY, NEW YORK, A CORPORATION OF NEW YORK.

BARREL.

961,737.

Specification of Letters Patent. Patented June 14, 1910.

Application filed August 26, 1909. Serial No. 514,712.

*To all whom it may concern:*

Be it known that I, GEORGE SHIELDS, a citizen of the United States, residing in Brooklyn, in the county of Kings and State of New York, have invented certain new and useful Improvements in Barrels, of which the following is a specification.

This invention relates to receptacles formed of metal containing a lining of vitreous material or enamel, for containing spirituous liquors and other substances that act upon a metal vessel having no lining.

The object of the invention is to provide a receptacle or barrel of this nature, formed in two complemental cup members joined together, whereby the protecting lining will extend into the joint and thoroughly protect the metal at the joint from access by the liquid.

In the accompanying drawing showing an embodiment of my invention, Figure 1 is a longitudinal section of the barrel. Fig. 2 shows enlarged a section through one of the joints, when the members are first brought together. Fig. 3 is a view similar to Fig. 2, with the end portions of the flanges rolled together; and Fig. 4 shows still further enlarged, the flanges brought together under pressure and the joint closed.

This invention is an improvement on a joint for barrel patented to me September 22nd, 1908, No. 899,338. In such receptacle the flanges projected outwardly from the two cup members, and were secured by soldering or welding at their outer edges, and the lining of enamel at its edges brought together into contact. In the present invention, the enamel lining extends a short distance into and between the flange portions of the two cup members, and then a washer or flat ring member is interposed between these two flange portions covered with the enamel, and the end portions of the flange portions of the cup members, are rolled together to form a bead under high pressure to produce a fluid tight mechanical joint, without the necessity of soldering or welding.

The washer member interposed between the lined portions of the flanges is preferably of a soft metal such as block tin, that will be compressed when the flanges are rolled together and will prevent fracture of the lining, at the same time will form a tight joint.

In the drawings the receptacle is shown as formed by two cup shaped members 5 and 6, having at their edges flanges 7 and 8 extending outwardly. Before these cup members are brought together they are given a lining of vitreous material or enamel, 9 and 10, that extends a short distance only on the flange portions, as denoted by 11 and 12. A flat ring washer 13 is interposed between the lined portions of the flanges, and is formed of any suitable material soft enough to admit of a certain amount of compression. If desired this ring member may extend a short distance beyond the lined portion of the flanges.

The portions of the flanges adjacent the cup members extend substantially transverse to the cup members for a distance slightly greater than the length of the lining portions of the flanges, and then the end portions of the flanges are brought together and given a roll or bead 14, under extreme pressure whereby a fluid tight joint is produced, as indicated in Fig. 4. At the same time the straight portions of the flanges are pressed together to tightly engage the washer between the lined portions of the flanges and thereby form a fluid tight joint, so that the liquid cannot enter the joint and have access to the metal beyond the lining portion. Where the washer is formed of tin or the like, it will compress and conform to the inequalities of the lining at the flanges. It will be seen that this joint is formed without the soldering or welding of the flange portions, and at the same time a tight joint is formed between the lined cup members of the receptacle.

Preferably the metal receptacle is inclosed in a wooden casing W provided with a suitable socket S for the joint of the barrel.

Having thus described my invention, I claim:

A receptacle comprising two complemental cup-shaped members provided with outwardly extended flanges, each portion being provided with a vitreous lining extending between the flanges, a flat ring washer of comparatively soft metal interposed and
5 entirely separating the said lined flange portions of the cup members, the outer parts of the flange portions being rolled upon themselves to form a bead and effect a fluid-tight joint of the cup shaped members.

GEORGE SHIELDS.

Witnesses:
 WM. H. REID,
 HENRY E. GREENWOOD.